United States Patent
Laude

(10) Patent No.: US 8,932,696 B2
(45) Date of Patent: Jan. 13, 2015

(54) LEGALLY SAFE RECORDABLE INFORMATION STORAGE MEDIUM

(75) Inventor: Lucien Diego Laude, Rabastens de Bigarre (FR)

(73) Assignee: Lucien Diego Laude, Rabastens de Bigarre (FR)

(*) Notice: Subject to any disclaimer, the term of this patent is extended or adjusted under 35 U.S.C. 154(b) by 0 days.

(21) Appl. No.: 13/876,261

(22) PCT Filed: Sep. 28, 2011

(86) PCT No.: PCT/FR2011/000529
§ 371 (c)(1),
(2), (4) Date: Mar. 27, 2013

(87) PCT Pub. No.: WO2012/042129
PCT Pub. Date: Apr. 5, 2012

(65) Prior Publication Data
US 2013/0188468 A1    Jul. 25, 2013

(30) Foreign Application Priority Data
Sep. 29, 2010  (FR) ..................... 10 03848

(51) Int. Cl.
| | | |
|---|---|---|
| *G11B 7/24* | (2013.01) | |
| *G11B 7/24035* | (2013.01) | |
| *G11B 7/2433* | (2013.01) | |
| *G11B 7/26* | (2006.01) | |
| *G11B 7/24038* | (2013.01) | |
| *G11B 7/243* | (2013.01) | |

(52) U.S. Cl.
CPC ........ *G11B 7/24035* (2013.01); *G11B 7/24038* (2013.01); *G11B 7/2433* (2013.01); *G11B 2007/24304* (2013.01); *G11B 2007/2431* (2013.01); *G11B 2007/24314* (2013.01); *G11B 2007/24316* (2013.01); *G11B 7/268* (2013.01)
USPC ..................... 428/64.1; 428/64.4; 430/270.13

(58) Field of Classification Search
CPC ....... G11B 7/24; G11B 7/243; G11B 7/24038
USPC ........................................ 428/64.4
See application file for complete search history.

(56) References Cited

U.S. PATENT DOCUMENTS

| | | | |
|---|---|---|---|
| 4,463,028 A | 7/1984 | Laude | |
| 4,469,551 A | 9/1984 | Laude | |
| 2005/0018589 A1* | 1/2005 | Mizushima et al. | 369/275.2 |
| 2006/0120253 A1* | 6/2006 | Chen et al. | 369/272.1 |
| 2008/0198739 A1* | 8/2008 | Lee et al. | 369/286 |

FOREIGN PATENT DOCUMENTS

| | | |
|---|---|---|
| EP | 0045551 A1 | 2/1982 |
| EP | 0048514 A1 | 3/1982 |
| EP | 1426941 A1 | 6/2004 |
| JP | 11034501 A | 2/1999 |
| JP | 2000187884 A | 7/2000 |

* cited by examiner

*Primary Examiner* — Elizabeth Mulvaney
(74) *Attorney, Agent, or Firm* — Bachman & LaPointe, P.C.

(57) ABSTRACT

A recordable information consists of a flat polycarbonate disk having two main faces and a light sensitive film covering one main face and on which information may be recorded. The film is multi-layered with at least two elementary superposed layers, respectively containing one element A and one element B, one of the layers containing an element chosen in the Group IIIa, while the other layer contains an element chosen in Groups Va or VIa; or one of layers contains an element from Groups IIa or IIb while the other layer contains an element from Group VI. The thickness of each layer is nearly identical and the overall thickness of the light-sensitive film being at least equal to 35 nm. A burning process for safely and durably recording information on such a medium is also disclosed.

8 Claims, No Drawings

LEGALLY SAFE RECORDABLE INFORMATION STORAGE MEDIUM

BACKGROUND

The present invention generally relates to a recordable information storage medium (e.g. CD-R medium), such as a compact disc, which cannot be eroded, with high security registration and legally secure.

Typically, a CD-R medium consists of a flat polycarbonate disk, coated on one of its main faces with a light sensitive film. By irradiating the film with a light beam emitted, for example, by a laser diode of 10 mW (called the writing diode), local transformations of said film are produced. These transformations may induce a measurable change in the physical properties of the film, in particular its optical reflectivity. Such latter change is particularly exploited for both, incorporating information on the CD-R and then reading it.

The information itself is inscribed on the film in a digital form as a coded series of circular zones or spots of submicron size, treated and processed by laser irradiation, Usually, these spots are distributed along an elliptical spiral track which is drawn on the disk using a standard scanning system known in the prior art.

In order to be usable, the CD-R should have the two following essential characteristics:
 a) sensitivity of the pristine film to the light that is emitted by the writing laser diode, thus promoting an optically detectable change of the film, thereby forming spots produced by the laser treatment. Such a film change may be generated by various processes: melting, bleaching, evaporation, creating roughness, ablation, crystallization of an amorphous film or changing the chemistry of the film, for example upon the synthesis of a compound;
 b) morphological stability of the film relative to ambient conditions, such as temperature, visible light, humidity, magnetic fields or mechanical disturbance (with a tool or upon handling), the said stability relating to both the spots and the film surface which is not treated by the laser.

After inscribing the spots and thereby recording the information, the latter must be read by optical means. To this end, the light emitted by a diode (called the reading diode) or an LED (i.e. a light-emitting device) is scanned along the elliptical track and, simultaneously, the light which is reflected by the film is detected and recorded. The beam emitted by the reading diode is continuous and monochromatic. It operates at a wavelength $\lambda_R$ ranging from 500 to 750 nm, i.e. at a photon energy comprised between 2.4 eV and 1.65 eV. The beam intensity of the reading diode is much lower than that of the writing diode, typically of the order of 1 mW. Any local morphological change of the film must produce a local change of the reflectivity of the film. That change is measured and detected with the reading diode. If this change can be evaluated, recording of the light which is reflected by the film allows the reading of the information after decoding the digitized information.

Usually, one defines a reading contrast C between the laser-treated spots and the pristine zones of the film is defined as:

$$C=(Rv-Rs)/(Rv\pm Rs),$$

where:
 $R_V$ denotes the value of the reflectivity (measured at $\lambda_R$) of the pristine film and
 $R_S$ denotes the reflectivity value (measured at $\lambda_R$) of the spots.

The magnitude of this contrast C is important for assessing the ability of the CD-R to record the information.

However, the long-term preservation of the recorded information is much more problematic, with heavy consequences, than the amplitude of this contrast alone.

Indeed, any material that would easily undergo a transformation by absorbing a small amount of light energy may as well be sensitive to small changes in environmental conditions (e.g. temperature).

In other words, sensitivity to light and morphological stability act in opposite directions: writing at a low energy does not predispose to long-term stability.

Current CD-R's have a film which is highly sensitive to light. Such a film consists in general of a mixture of organic species (chemicals, polymers). Recording information on such films is easily accomplished by transforming the film locally, for example by changing its color (and its reflectivity) or by ablating the film upon absorption of light and absorbing the resulting heat. The optical contrast C which is thus obtained is typically about 0.03 and contemporary CD-R light engravers (so-called burners) are actually set to read such a contrast.

Although this sensitivity to light has the advantage of allowing an easy information recording, it results in a higher fragility of the current CD-R's, especially against heat, as soon as the media is exposed to ambient light for a while.

Being sensitive to ambient in an unpredictable manner, these media are not considered to be safe in the long term. This is particularly critical for important information which must be stored in conditions of absolute safety, in particular medical, legal or military data.

The main consequence of this situation is that recording on current CD-R's is not entitled to legal legitimacy.

Another consequence is that re-recording at close intervals is required for the same information yet without ensuring its safety.

There is therefore a need for high reliability CD-R's on which the recorded information would remain completely insensitive to ambient conditions for extensive periods of time (e.g. exceeding twenty years), so that such recording could be regarded as permanent.

SUMMARY

The present invention aims at solving these problems and drawbacks, by providing means to ensure a secured and permanent information recording on a CD-R.

More particularly, the object of the present invention is a recordable information storage medium comprising:
 a flat polycarbonate disk having two major faces, and
 a light-sensitive film overlying one of said main faces of the disk on which face information may be recorded.

According to the invention, the film consists of a multilayer stack comprising at least two superposed elementary layers, respectively composed of an element A and an element B, said layers being distributed as follows:
 one of the layers being composed of an element selected from Group IIIa, whereas the other layer is made of an element selected from Groups Va or VIa, or
 one of the layers being composed of an element selected from Groups IIa or IIb, and the other layer is made of an element selected from Group VI,
 the thickness of each layer being substantially identical and the total thickness of the light-sensitive film being at least equal to 35 nm, and preferably at least 40 nm.

According to the invention, the sensitive film is thus essentially defined by two characteristics:

on the one hand, the compound AB (for example AlTe for Aluminum Telluride) the synthesis of which can be advantageously induced by laser irradiation (defining the so-called writing process via laser-induced synthesis, which is a process actually operating in the frame of the present invention), and on the other hand, the thickness of the film, and therefore the individual thicknesses of materials A and B which are superposed to form the film.

The compound AB is covalent. Contrary to metal alloys, compounds that are said covalent associate, through strong interatomic bonds, elements belonging respectively to the following columns of the Periodic Table of the Elements:

II B (e.g. Cd and Zn) and VI A (e.g. Se and Te)

III A (e.g. Al and In) and V A (e.g. As and Sb)

III A and VI A.

The choice of the compound AB goes to the one providing the highest optical contrast C against the pristine film at the time of reading the information which is burned on the film.

In an advantageous embodiment of the writing method via laser-induced synthesis, the choice goes on the compound AlTe (for Aluminum Telluride), when the upper elementary layer contains Al.

Regarding more particularly the thickness of the sensitive film and for any thickness lower than 35 nm, the film is usually semi-transparent even before any laser irradiation and regardless of the choice of the elements present in the film, thus reducing the reading contrast whatever the actual compound which would be synthesized in the film.

On the other hand, the larger the film thickness, the greater the intensity of the writing laser beam which is used for synthesizing the compound in this film that intensity being substantially proportional to the volume of matter contained in the film, i.e. to its thickness.

Therefore, a compromise must be set to optimize the choice of the film thickness vs. the intensity of the writing laser beams which are commonly used to burn a CD-R, while preserving the optical contrast defined by the choice of the elements A and B.

Finally, the thickness of a film is defined with a precision that is of the order of 2 to 5 nm. This precision affects each elementary layer containing one of the elements and contributing to the total thickness of the sensitive film. The smaller the thickness of an elementary layer, the greater the uncertainty in obtaining a ratio of the thicknesses of elementary layers containing A and B, said ratio that would be in the exact proportion corresponding to the stoichiometric composition of the selected compound.

Consequently, in the most advantageous form of using said writing process of laser-induced synthesis of a compound, the optimum thickness of the film is 40 nm, the film being composed of two superposed layers of identical thicknesses 20 nm, and each containing one single element: Te in the lower layer (directly deposited on the polycarbonate disk) and Al in the upper layer.

However, the sensitive film of the medium according to the invention may possibly have a thickness of about 35 nm, being composed of two layers of identical thicknesses of about 18 nm, each layer containing a single element (i.e. either Te or Al).

In other possible configurations of the recordable information medium according to the invention, the sensitive film may be composed of two superposed elementary layers (each containing either Te or Al), such layers having identical thicknesses of up to 25 nm (for a total sensitive film thickness of 50 nm) or 30 nm (for a total thickness of this film of 60 nm).

In all these configurations of the sensitive film, the elementary layer which is in direct contact with the substrate is always composed of Te and the upper layer which is superposed on it always consists of Al.

DETAILED DESCRIPTION

According to a first particularly advantageous embodiment of the invention, the multilayer film is composed of the superposition of two elementary layers each having a thickness of between 18 and 30 nm, and preferably of the order of 20 nm. The film is opaque to ambient light.

Preferably, it is a multilayer film consisting of two layers, successively distributed from the flat polycarbonate disk as follows:

a lower layer of tellurium or antimony, which covers the flat disk, and an upper layer of aluminum completely covering said lower layer.

According to a second particularly advantageous embodiment of the present invention, the multilayer film consists of four elementary layers each having a thickness of about 10 nm.

Preferably, it is a film consisting of four layers distributed as follows from the flat polycarbonate disk:

a lower layer of tellurium which covers the flat disk, a first intermediate layer of aluminum completely covering said lower layer of tellurium, a second intermediate layer of tellurium, completely covering the first intermediate layer of aluminum, and a top layer of aluminum, completely covering the second intermediate layer of tellurium.

Preferably, regardless of the configuration of the devised sensitive film, the outer layer of the multilayer film is a layer of aluminum, which provides a high reflectivity to the visible light emitted by a standard reading diode. Moreover, as soon as this layer is produced and then exposed to air, a very thin (about 2 nm thick) layer of oxide develops on its surface. Being dense, this oxide layer protects the film from moderate mechanical damage and occasional ambient contamination.

Other compounds containing aluminum may be used on a CD-R, for example those combining the following pairs of elements: Al/Sb, Al/Se, and Al/As.

Only the compounds AlTe and $Al_2Te_3$ have optical absorption starting in the infrared ($\lambda_R$<1200 nm, thus photon energy >1.2 eV), thus providing access to the highest optical contrast C.

The present invention also relates to a method for securely and durably recording information on a light-sensitive film, characterized in that it comprises:

a) providing a substrate provided with a multilayer light-sensitive film as defined in any one of claims 1 to 5, and b) synthesizing by laser irradiation a compound $A_nB_m$ constituted from elements A and B contained, in stoichiometric proportions, in the elementary layers of said sensitive film, said thus formed compound $A_nB_m$ being in the form of circular spots having optical contrast C at least equal to 0.5, and preferably at least equal to 0.8.

The process according to the invention uses, in step b) above the laser irradiation synthesis process described in the European patents EP0045551 and EP0048514 belonging to the present applicant. This latter process is unique in that it originates in the instantaneous absorption of the light energy during the interaction of the incoming light photons with the valence electrons in the film which is irradiated by the laser beam. Although phonons are created during this interaction and that heat is therefore generated, the process is not driven by considerations of thermodynamic equilibrium. This is indeed a non-equilibrium process that is not based on classical laws of atomic diffusion. Indeed, no conventional heat source can simulate the abrupt rise of the intensity of any laser source ($<10^{-4}$ s), such that, for example, the one produced by the absorption of the light emitted by a laser diode ($10^{-6}$ s).

In the present invention, the light-sensitive film which is deposited on the polycarbonate disk is formed by a stack of two elementary layers containing respectively atoms A and B. The atomic contents of these elementary layers and their respective thicknesses are such that the ratio of the atoms A and B corresponds to the stoichiometric composition of a given compound which would be formed with such atoms A and B, for example the proportion ⅔ for compound $A_2B_3$.

By irradiating the two-layer stack with a laser beam, one or both layers can be brought to melt very quickly during the irradiation, thus promoting the rapid (called ballistic) migration of atoms A and/or B across the interface of the two layers. Atoms initially belonging to the one or both melting layers mix before any interatomic reaction (e.g. forming covalent bonds) could take place. Depending on the choice of atoms A and B (i.e. their types and their proportion), this interatomic migration may result in either a homogeneous metal alloy or a thus synthesized compound.

In addition to a high optical contrast and optimum morphological stability, the laser-induced synthesis of a compound offers specific advantages. Indeed, materials known as compounds are characterized by strong (covalent or ionic) interatomic bonds.

Regarding their optical properties, and for each compound material, this type of bonding results in an optical absorption threshold at a particular photon energy which is characteristic of that compound. This energy $E_G$ defines the absorption threshold of the compound. It is the minimum photon energy required to allow this compound to absorb photons.

As a result, these compounds may be either semi-transparent or possibly opaque at the monochromatic light emitted by the reading diode.

As for compounds $A_nB_m$ which can be synthesized by laser irradiation, one may mention Aluminum Antimonide (AlSb, $E_G$=1.60 eV), Cadmium Telluride (CdTe, $E_G$=1.49 eV), Cadmium Selenide (CdSe, $E_G$=1.73 eV).

Depending on the choice of the working wavelength of the reading diode, the laser-induced synthesis of a specific compound $A_nB_m$ may lead to a very high optical contrast C between the high reflectivity of a metal, like the one of the pristine upper aluminum layer of the sensitive film before laser irradiation, and the reflectivity of the irradiated spots which are made of the synthesized compound material.

In order to obtain the highest contrast C, it is interesting to focus attention on compounds that may completely absorb the light emitted by the reading diode, i.e. the most appropriate choice of both i) the type of the atomic elements, and ii) their proportion in order to achieve synthesis this objective.

Achieving the highest contrast C has particular advantages:
 i) the size of transformed spots which are distributed along the elliptical track may be reduced, and
 ii) the detection of a spot may be faster.

In other words, on a standard CD-R medium of 12.5 cm diameter, the volume of the recorded information may be larger and its reading may proceed faster.

The morphological stability and integrity of the above described sensitive film must be established both before and after integration of the information on the disk. This stability can be disturbed in two ways:

i) by the migration of foreign species (for example water) along the interface between the film and the surface of the polycarbonate substrate, and
 ii) by the premature mixing (at low or room temperature) of the elemental materials through the interface between the two layers which form the sensitive film.

Moreover, in addition to the high contrast writing, the laser-induced synthesis process of a specific compound $A_nB_m$ may be used to safely seal the pristine film versus ambient and, for example, prevent water migration along the interface between film and substrate.

Indeed, the compound synthesis is an exothermal process. Once melting is initiated by the absorption of the laser light, the compound synthesis develops by itself through the entire volume of the sensitive film which then consists of an homogeneous mixture of atoms A and B, this synthesis simultaneously generating heat which diffuses out of the film. By softening the surface of polycarbonate, that heat helps in letting the synthesized compound strongly adhere on the support to the point that the thus processed film cannot be removed from the support by peeling.

According to the invention, the complete sealing of the pristine film on a substrate having an orifice at its center adapted to mounting said substrate in a reader, is performed by scanning the beam of a writing laser diode along two traces, said traces consisting of a compound material synthesized by laser irradiation and said traces having a width equal to or greater than 1 μm, said traces being distributed as follows:

a first trace on the outer edge of the film surface (of the order of 12 cm in diameter in the case of a circular CD-R), and
 a second trace on the inner border of the same film (of the order of 4 cm in diameter in the case of a circular CD-R), said traces being disposed at a distance of between 1 mm and 2 mm of said edges.

The seal is installed before any use of the CD-R.

Any atom diffusion of thermodynamic type is necessarily slow. This is the case of an atom diffusion developing at low temperature (for example at ambient temperature) through the interface between the two layers of the sensitive film. During such a slow diffusion, covalent bonds have time to be formed, inducing the formation of a very thin (barrier) of compound which blocks any further slow atom migration. Consequently, surfaces of the film which are not laser-treated remain pristine, a situation that may be changed drastically only by laser irradiation and the resulting fast atom migration that would follow.

On the other hand, the thus synthesized compound is homogeneous and very stable. It may not decompose any longer and return to the original metallic stack of the two individual layers. In other words, this way of writing information in the form of the coded series of spots is an irreversible process.

The integrity of the film is ensured both before and writing the information on the CD-R. In particular, access to incorporating information on any pristine CD-R is preserved over extensive periods of time.

The atomic elements A and B of the specific compound $A_nB_m$ are distributed on the Periodic Table of the Elements, on either side of the fourth column:
 compounds consisting of elements of groups III and V or VI (for example AlSb or AlTe) and
 compounds consisting of elements of groups II and VI (e.g. CdTe).

Among the compounds $A_nB_m$ which may be laser-synthesized, aluminum tellurides ($Al_2Te_3$ and AlTe) have specific advantages although they have not been studied nor even identified:

- both aluminum tellurides have an optical absorption threshold in the infrared at 1.0 eV, i.e. these compounds do absorb totally visible light and are black;
- since the outer layer of the sensitive film is made of aluminum, which is a metal with high reflectivity in the visible, the information recorded on the film has a very high optical contrast C:

$$C=(0.85-0.10)/(0.85+0.10)=0.79$$

for any reading system working in the visible. This C value is much higher than that performed with contemporary CD-R's (typically of the order of 0.20 to 0.30);
- these compounds incorporate aluminum (Al), i.e. a standard component which is widely used in the CD media industry.

Finally, the present invention also relates to a process for protecting indefinitely the physical integrity of the sensitive film of the recordable information storage medium constructed according to the invention, said medium being eventually circular and possessing a hole in its center that would be suitable for mounting said medium in a reading drive.

Said process being characterized in that it comprises a sealing step of the useful part of the film on its substrate, by burning two continuous traces of a synthesized compound as obtained by laser irradiation, said traces having a width preferably greater than or equal to 1 μm, this sealing step being performed before any use, the film thereby being pristine, said traces setting between them the boundaries of the useful part of the film as follows:

- a first trace on the outer edge of the working portion of the film, and
- a second trace on the inner border of the same working portion of the film, said trace being preferably disposed around the central hole of the substrate in the case of a circular substrate.
- said traces being advantageously disposed at a distance of 1 mm to 2 mm of said edges.

The substrate supporting the sensitive film may have any geometry, such as circular, square or rectangular, such geometry being distributed on a flat or curved surface, the useful part of the film being delineated and protected by one or more traces engraved on the periphery of the useful part of the film.

This method of infinite protection of the physical integrity of the sensitive film allows to manufacture and commercialize any CD-R information storage media on which information may be burned in a completely secure and legally safe manner with a life time that would exceed (but would not be limited to) 25 years, as shown in the following examples.

EXAMPLES

Example 1

A layer of antimony (Sb) is deposited on a glass plate, and is then covered with a layer of Aluminum (Al), said Al layer being itself covered with an Sb layer and finally another layer of Al.

All these layers have each the same thickness (20 nm) and form a film sensitive to light.

The stacking of these layers forming the film is irradiated by a continuous wave (CW) Argon laser beam working at a wavelength of 500 nm, 20 mW power, for 10 seconds on a surface of 0.5 mm diameter.

After irradiation, the irradiated surface is semi-transparent and has an orange color, which demonstrates the transformation of the Al/Sb stacking into the AlSb compound.

Example 2

A layer of Sb is deposited on a glass plate, and is further covered with a layer of Al, each of the two layers having a thickness of 20 nm, the stack of layers forming a light sensitive film.

The reflectivity of the film is high in the visible and corresponds to the one of the outer layer of Al. By irradiating this film with the beam of a monochromatic laser diode (10 mW power) for $10^{-5}$ s, formation of the AlSb compound is evidenced in the irradiated area, thus opening an optical window in the metallic film. The reading optical contrast C of this window is equal to 0.43.

Example 3

A 40 nm thick layer of Cadmium (Cd) is deposited on a polycarbonate substrate.

This layer is then covered with a layer of Tellurium (Te), also with a thickness of 40 nm.

The irradiation of the overall stack of the two layers forming the light-sensitive film by means of a CW laser beam induces synthesis of the CdTe compound which absorbs light below 620 nm.

The optical contrast C between the non-irradiated areas of the film and those areas which have been irradiated is equal to 0.33, demonstrating the importance of the choice of the selected elements in forming the sensitive layer. Maintained at ambient for a period of 25 years, the film retains an unchanged contrast C at 0.33.

Example 4

A layer of Tellurium (Te) is deposited on a polycarbonate substrate, and this layer of Te is then covered by a layer of Al.

The two layers have the same thickness of 20 nm and their stack forms a film sensitive to light.

The laser irradiation of the thus formed film is carried out for $10^{-6}$ s, with the beam emitted by a laser diode emitting in the near infrared (690 nm) with a power of 10 mW.

After irradiation, the irradiated area is completely black, with an optical contrast C equal to 0.80.

Example 5

A layer of Tellurium (Te) of 20 nm thickness is deposited on a polycarbonate substrate. This Te layer is then successively covered with a layer of Al of thickness 15 nm, and then a 20 nm thick layer of Te and finally by a 15 nm thick Al layer forming the top layer of the stack.

The stacking of these layers form the light-sensitive film which is then irradiated with the same laser beam as used in Example 4. The irradiated area appears then gray, with an optical contrast C equal to 0.54, i.e. below the contrast obtained in Example 4 wherein the layers of Al and Te have the same thickness.

Example 6

A film consisting of two layers as in Example 4 is maintained at room temperature (24° C.) for 8 years. The contrast C is then re-evaluated at C=0.80.

Example 7

A film identical to the one produced in Example 4 is heated to 50° C. for 48 hours and the contrast C is then re-evalued at 0.80, without any change since irradiation.

Example 8

The interface between the film and the polycarbonate substrate may not be safely sealed to the migration of water over time. When the latter develops, aging of the film is usually observed, which is characterized by a detachment of the film, altering and reducing the optical contrast C.

22An experiment was carried out which consists in programming the movement of a film produced according to the process with a laser beam operating in continuous wave (CW) in such a way as to achieve the writing of either a continuous ring of processed material, or an incomplete, i.e. discontinuous, ring.

In the first case, an isolated area of the film is delineated by the ring, such area being completely separated from the rest of the film which lays outside the ring.

In the second case, the ring is discontinuous and the area of the film which lays inside he discontinuous ring remains in contact with the portion of the rest of the film located outside the ring.

The evolution of the aspect of the non-irradiated part of the film laying either within or beyond the continuous or discontinuous ring was traced periodically. Very quickly, i.e. five weeks after completion of these two types of writing, observation shows that:

a) the portion of the film which is entirely contained in the continuous ring has not changed over time and maintains the same high contrast vs. the area which has been transformed by the laser and which is materialized by the ring itself.

b) the area of the film that is contained in the discontinuous ring has the same appearance as the area of the film located outside the ring, these two areas having a much reduced contrast against the ring itself.

Example 9

A film identical to that produced in Example 3 (i.e. two overlapping layers of Cadmium and Tellurium) was irradiated by the beam of a laser operating in continuous wave (CW) in the infrared (at 690 nm), along a continuous circular trace (i.e. a ring) of 2 cm diameter and 1 mm trace width, this track materializing a ring of processed CdTe material.

In the area of the film which is entirely contained in the said ring, a series of spots of processed CdTe material is performed at regular intervals of 0.1 mm by moving the film in a plane perpendicular to the axis of the laser beam, irradiation being carried out by a laser diode operating over a very short period of time ($10^{-6}$ s). Each spot is limited to a circular area of diameter 0.1 mm by focusing the laser beam. This high contrast (C=0.33) writing was then monitored stored periodically over a period of 25 years to assess the sustainability of its contrast.

After 25 years of evaluation, one finds that this contrast is fully maintained, and the spots of transformed material are always well defined with their nominal diameter of 0.1 mm at 0.1 mm intervals. This result is achieved thanks to the protection exerted by the ring of processed material which surrounds the area of writing.

The invention claimed is:

1. A recordable information medium comprising:
   a flat polycarbonate disk having two main faces; and
   a light sensitive film overlying one of said main faces and on which information may be recorded,
   wherein the light sensitive film is a multilayer film comprising at least two elementary superposed layers respectively composed of a first element A and a second element B,
   wherein said light sensitive film has a total thickness of at least 35 nm, and
   wherein the multilayer film comprises two elementary layers, and said two elementary layers comprises a first layer of a material selected from the group consisting of tellurium and antimony covering the flat polycarbonate disk and a second layer of aluminum having a thickness of 20 nm completely covering said first layer.

2. A recordable information storage medium according to claim 1, wherein the multilayer film is composed of two elementary layers and each of said two elementary layers has a thickness between 18 and 30 nm.

3. A recordable information storage medium according to claim 1, wherein the multilayer film consists of four elementary layers and each of said elementary layers having a thickness of about 10 nm.

4. A recordable information storage medium according to claim 3, wherein said four elementary layers comprise a first layer composed of tellurium covering said flat polycarbonate disk, a second layer of aluminum completely covering said first layer, a third layer of tellurium completely covering said second layer, and a fourth layer of aluminum completely covering the third layer and wherein said first layer is an innermost layer, said second and third layers are intermediate layers, and said fourth layer is an outermost layer.

5. A method for recording securely and durably information on a light sensitive film comprising the steps of:
   providing a flat polycarbonate disk having two main faces; and
   providing a light sensitive film overlying one of said main faces and on which information may be recorded, wherein the light sensitive film is a multilayer film comprising at least two elementary superposed layers respectively composed of a first element A comprising tellurium and a second element B comprising aluminum, and
   synthesizing by laser irradiation a covalent compound $A_nB_m$ made out of said first element A and said second element B contained in stoichiometric proportions in the at least two elementary superposed layers so that said compound $A_nB_m$ forms circular spots having an optical contrast C equal to at least 0.5.

6. A method according to claim 5, wherein said synthesizing step forms said circular spots so that said optical contrast C is at least 0.8.

7. A method for sealing a sensitive film of a medium comprising: a flat polycarbonate disk having two main faces; and a light sensitive film overlying one of said main faces and on which information may be recorded, wherein the light sensitive film is a multilayer film comprising at least two elementary superposed layers respectively composed of a first element A and a second element B, wherein each layer of said at least two elementary superposed layers and said light sensitive film having a total thickness of at least 35 nm, and wherein said at least two elementary superposed layers are distributed as follows: (I) a first one of the at least two elementary superposed layers having a thickness of no greater than 20 nm and being composed of said first element A being selected from the group IIIa and a second one of the at least two elementary superposed layers being made of said second element B being selected from Groups Va or VIa, or (II) a first one of the at least two elementary superposed layers being composed of said first element A being selected from the group IIb and a second one of the at least two elementary superposed layers being made of said second element B selected from Group VIa, said method comprising the steps of:
- producing two traces made of a compound synthesized by laser irradiation with each of said two traces having a width of at least 1 micron;
- distributing said two trace so that a first one of said traces is on an outer edge of a surface of said light sensitive film and a second one of said traces is on an inner border of said light sensitive film; and
- running said first one of said traces at a distance of from 1.0 to 2.0 mm. from said outer edge and running said second one of said traces at a distance of 1.0 to 2.0 mm. from said inner border.

8. A process for protecting indefinitely physical integrity of a light sensitive film of a recordable information medium which comprises a flat polycarbonate disk having two main faces; and said light sensitive film overlying one of said main faces, wherein the light sensitive film is a multilayer film comprising at least two elementary superposed layers respectively composed of a first element A and a second element B, wherein each layer of said at least two elementary superposed layers and said light sensitive film having a total thickness of at least 35 nm, and wherein said at least two elementary superposed layers are distributed as follows: (I) a first one of the at least two elementary superposed layers being composed of said first element A being selected from the group IIIa and a second one of the at least two elementary superposed layers being made of said second element B being selected from Groups Va or VIa, or (II) a first one of the at least two elementary superposed layers being composed of said first element A being selected from the group IIa or IIb and a second one of the at least two elementary superposed layers being made of said second element B selected from Group VIa, said medium being circular and having a center opening adapted for mounting said medium in a reading drive, said process comprising the steps of:
- sealing a usable part of the light sensitive film on the medium by burning two continuous traces of a laser synthesized compound each having a width of at least 1.0 micron so that said traces set boundaries of the usable part of the film;
- said sealing step being performed before any use of the medium so that said light sensitive film is pristine;
- said sealing step comprising forming a first one of said traces along an outer edge of the usable part of the light sensitive film and running said first one of said traces at a distance of from 1.0 to 2.0 mm from said outer edge; and
- said sealing step further comprising forming a second one of said traces along an inner border of said usable part of said light sensitive film and running said second one of said traces at a distance of from 1.0 to 2.0 nm from said inner border.

* * * * *